United States Patent
Khlat et al.

(10) Patent No.: US 12,525,955 B2
(45) Date of Patent: Jan. 13, 2026

(54) TUNABLE FERROELECTRIC ACOUSTIC RESONATOR STRUCTURE

(71) Applicant: Qorvo US, Inc., Greensboro, NC (US)

(72) Inventors: Nadim Khlat, Cugnaux (FR); Milad Zolfagharloo Koohi, Longwood, FL (US); Paul Stokes, Orlando, FL (US)

(73) Assignee: Qorvo US, Inc., Greensboro, NC (US)

( * ) Notice: Subject to any disclaimer, the term of this patent is extended or adjusted under 35 U.S.C. 154(b) by 144 days.

(21) Appl. No.: 18/524,882

(22) Filed: Nov. 30, 2023

(65) Prior Publication Data

US 2024/0213956 A1 Jun. 27, 2024

Related U.S. Application Data

(60) Provisional application No. 63/476,523, filed on Dec. 21, 2022.

(51) Int. Cl.
*H03H 9/205* (2006.01)
*H04B 1/00* (2006.01)

(52) U.S. Cl.
CPC ............ *H03H 9/205* (2013.01); *H04B 1/006* (2013.01)

(58) Field of Classification Search
CPC ......... H03H 9/205; H03H 9/542; H04B 1/006
(Continued)

(56) References Cited

U.S. PATENT DOCUMENTS

| | | | |
|---|---|---|---|
| 4,924,195 A | 5/1990 | Gonda | |
| 6,242,843 B1 | 6/2001 | Pohjonen et al. | |

(Continued)

FOREIGN PATENT DOCUMENTS

| | | |
|---|---|---|
| CN | 107727125 A | 2/2018 |
| JP | 3854212 B2 | 12/2006 |

(Continued)

OTHER PUBLICATIONS

Gokhale, V. et al., "Phonon-Electron Interactions in Piezoelectric Semiconductor Bulk Acoustic Wave Resonators," Scientific Reports, vol. 4, Article No. 5617, Jul. 2014, 10 pages.

(Continued)

*Primary Examiner* — Andrea Lindgren Baltzell
*Assistant Examiner* — Victor Cole
(74) *Attorney, Agent, or Firm* — Withrow & Terranova, P.L.L.C.

(57) ABSTRACT

A ferroelectric acoustic resonator structure is provided. The tunable ferroelectric acoustic resonator structure is configured to resonate in a series resonance frequency to pass a signal from a signal input to a signal output and block the signal in a parallel resonance frequency by presenting an equivalent parallel capacitance between the signal input and the signal output. The series resonance frequency can be tuned by applying a voltage to polarize the tunable ferroelectric acoustic resonator structure. However, the voltage can also cause an increase in the equivalent parallel capacitance to therefore shift the parallel resonance frequency toward the series resonance frequency. Herein, the tunable ferroelectric acoustic resonator structure is configured to reduce the equivalent parallel capacitance that is increased when tuning the series resonance frequency. Hence, it is possible to change the series resonance and maintain the parallel resonance frequency of the tunable ferroelectric acoustic resonator structure.

20 Claims, 5 Drawing Sheets

(58) Field of Classification Search
USPC .................................................. 333/186, 187
See application file for complete search history.

(56) References Cited

U.S. PATENT DOCUMENTS

| | | |
|---|---|---|
| 6,862,441 B2 | 3/2005 | Ella |
| 7,161,434 B2 | 1/2007 | Rhodes |
| 7,367,095 B2 | 5/2008 | Larson, III et al. |
| 7,454,178 B2 | 11/2008 | Block et al. |
| 7,656,228 B2 | 2/2010 | Fukuda et al. |
| 7,659,796 B2 | 2/2010 | Funami et al. |
| 7,692,270 B2 | 4/2010 | Subramanyam et al. |
| 7,804,374 B1 | 9/2010 | Brown et al. |
| 8,269,577 B2 | 9/2012 | Inoue et al. |
| 8,576,024 B2 | 11/2013 | Erb et al. |
| 9,041,484 B2 | 5/2015 | Burgener et al. |
| 9,190,979 B2 | 11/2015 | Granger-Jones et al. |
| 9,255,912 B2 | 2/2016 | Johnston et al. |
| 9,281,800 B2 | 3/2016 | Tsuzuki |
| 9,438,202 B2 | 9/2016 | Reinhardt et al. |
| 9,705,473 B2 | 7/2017 | David et al. |
| 9,819,327 B2 | 11/2017 | Maruthamuthu et al. |
| 9,847,769 B2 | 12/2017 | Khlat et al. |
| 10,009,010 B2 | 6/2018 | Kando et al. |
| 10,243,537 B2 | 3/2019 | Khlat |
| 10,476,481 B2 | 11/2019 | Chen et al. |
| 10,985,731 B2 | 4/2021 | Khlat |
| 11,050,412 B2 | 6/2021 | Khlat et al. |
| 11,095,268 B2 | 8/2021 | Schmidhammer |
| 11,165,412 B2 | 11/2021 | Khlat et al. |
| 11,165,413 B2 | 11/2021 | Khlat et al. |
| 11,742,818 B2 | 8/2023 | Khlat |
| 2002/0158717 A1 | 10/2002 | Toncich |
| 2002/0163400 A1 | 11/2002 | Toncich |
| 2003/0227338 A1 | 12/2003 | Kawakubo et al. |
| 2006/0098723 A1 | 5/2006 | Toncich et al. |
| 2007/0107519 A1 | 5/2007 | Liu et al. |
| 2007/0131032 A1 | 6/2007 | Liu |
| 2007/0296513 A1 | 12/2007 | Ruile et al. |
| 2008/0065290 A1 | 3/2008 | Breed et al. |
| 2008/0129416 A1 | 6/2008 | Volatier et al. |
| 2009/0289526 A1 | 11/2009 | Sinha et al. |
| 2009/0315643 A1 | 12/2009 | Yamakawa et al. |
| 2010/0308933 A1 | 12/2010 | See et al. |
| 2012/0212304 A1 | 8/2012 | Zhang et al. |
| 2012/0313731 A1 | 12/2012 | Burgener et al. |
| 2014/0070905 A1 | 3/2014 | Raieszadeh et al. |
| 2015/0163044 A1 | 6/2015 | Analui et al. |
| 2016/0191012 A1 | 6/2016 | Khlat et al. |
| 2017/0040948 A1 | 2/2017 | Levesque |
| 2017/0048859 A1 | 2/2017 | Hayakawa |
| 2017/0093370 A1 | 3/2017 | Khlat et al. |
| 2017/0214389 A1 | 7/2017 | Tsutsumi |
| 2017/0230066 A1 | 8/2017 | Little et al. |
| 2017/0244382 A1 | 8/2017 | Lear |
| 2017/0264268 A1 | 9/2017 | Schmidhammer |
| 2018/0076793 A1 | 3/2018 | Khlat et al. |
| 2018/0123562 A1 | 5/2018 | Bradley |
| 2018/0159562 A1 | 6/2018 | Bauder |
| 2018/0234078 A1 | 8/2018 | Wada et al. |
| 2019/0081613 A1 | 3/2019 | Nosaka |
| 2019/0260355 A1 | 8/2019 | Khlat |
| 2019/0393860 A1 | 12/2019 | Shih et al. |
| 2020/0028491 A1 | 1/2020 | Kuroyanagi |
| 2020/0076366 A1 | 3/2020 | Bahr et al. |
| 2020/0099360 A1 | 3/2020 | Khlat |
| 2020/0099363 A1 | 3/2020 | Khlat |
| 2020/0099364 A1 | 3/2020 | Khlat |
| 2020/0136589 A1* | 4/2020 | Khlat ................... H03H 9/605 |
| 2020/0274519 A1 | 8/2020 | Gamble et al. |
| 2021/0194459 A1 | 6/2021 | Alavi et al. |
| 2021/0399750 A1 | 12/2021 | Varela Campelo |
| 2023/0093885 A1 | 3/2023 | Ella et al. |
| 2023/0134889 A1 | 5/2023 | Costa |
| 2023/0223920 A1 | 7/2023 | Koohi et al. |
| 2023/0223922 A1 | 7/2023 | Koohi et al. |
| 2023/0223926 A1 | 7/2023 | Koohi et al. |
| 2023/0299746 A1 | 9/2023 | Levesque |
| 2024/0014803 A1 | 1/2024 | Khlat |
| 2024/0053193 A1 | 2/2024 | Khlat |
| 2024/0097650 A1 | 3/2024 | Khlat et al. |
| 2024/0258992 A1 | 8/2024 | Khlat |
| 2024/0333257 A1 | 10/2024 | Khlat |
| 2024/0333259 A1 | 10/2024 | Khlat |
| 2024/0364309 A1 | 10/2024 | Khlat |
| 2024/0413809 A1 | 12/2024 | Khlat |

FOREIGN PATENT DOCUMENTS

| | | |
|---|---|---|
| JP | 2009130831 A | 6/2009 |
| JP | 2022548348 A | 11/2022 |

OTHER PUBLICATIONS

Sis, S.A., "Ferroelectric-on-Silicon Switchable Bulk Acoustic Wave Resonators and Filters for RF Applications," A dissertation submitted in partial fulfillment of the requirements for the degree of Doctor of Philosophy (Electrical Engineering) in the University of Michigan, 2014, 152 pages.

Tirado, J.V., "Bulk Acoustic Wave Resonators and their Application to Microwave Devices," Ph.D Dissertation, Department of Telecommunications and Systems Engineering, Universitat Autonoma de Barcelona (UAB), 2010, 201 pages.

Ghosh, S. et al., "Experimental Observation of Electron-Phonon Interaction in Semiconductor on Solidly Mounted Thin-Film Lithium Niobate," 2022 IEEE MTT-S International Conference on Microwave Acoustics and Mechanics (IC-MAM), Jul. 18-20, 2022, Munich, Germany, IEEE, 4 pages.

Elkholy, M. et al., "Low-Loss Integrated Passive CMOS Electrical Balance Duplexers With Single-Ended LNA," IEEE Transactions on Microwave Theory and Techniques, vol. 64, No. 5, May 2016, IEEE, pp. 1544-1559.

Kang, P. et al., "Dual-Band CMOS RF Front-End Employing an Electrical-Balance Duplexer an N-Path LNA for IBFD and FDD Radios," IEEE Transactions on Microwave Theory and Techniques, vol. 69, No. 7, Jul. 2021, IEEE, pp. 3528-3539.

Yu, X., "Design of reconfigurable multi-mode RF circuits," A dissertation submitted to the graduate faculty in partial fulfillment of the requirements for the degree of Doctor of Philosophy, Iowa State University, Ames, Iowa, 2013, 127 pages.

Khan, A.I. et al., "Negative Capacitance in a Ferroelectric Capacitor," Nature Materials, vol. 14, Feb. 2015, first published Dec. 2014, Macmillan Publishers Limited, pp. 182-186.

* cited by examiner

TUNABLE FERROELECTRIC ACOUSTIC RESONATOR STRUCTURE

RELATED APPLICATIONS

This application claims the benefit of U.S. provisional patent application Ser. No. 63/476,523, filed on Dec. 21, 2022, the disclosure of which is hereby incorporated herein by reference in its entirety.

FIELD OF THE DISCLOSURE

The technology of the disclosure relates generally to a tunable ferroelectric acoustic resonator structure.

BACKGROUND

Wireless devices have become increasingly common in current society. The prevalence of these wireless devices is driven in part by the many functions that are now enabled on such devices for supporting a variety of applications. In this regard, a wireless device may employ a variety of circuits and/or components (e.g., filters, transceivers, antennas, and so on) to support different numbers and/or types of applications.

Ferroelectric acoustic resonators, such as ferroelectric bulk acoustic resonators (FBAR), offer ultra-small size and can operate at frequencies up to tens of gigahertz. As such, ferroelectric resonators are widely used as miniaturized filters in many high-frequency devices, such as fifth generation (5G) and 5G new radio (5G-NR) communication and/or navigation devices. The operating frequency (a.k.a. series/parallel resonance frequency) of a ferroelectric acoustic resonator is typically determined by an inner structure (e.g., thickness and elastic properties) of the ferroelectric acoustic resonator. As such, it is desirable to electrically control the ferroelectric acoustic resonator to operate at a desired operating frequency without changing the inner structure of the ferroelectric acoustic resonator.

SUMMARY

Aspects disclosed in the detailed description include a tunable ferroelectric acoustic resonator structure. The tunable ferroelectric acoustic resonator structure is configured to resonate in a series resonance frequency to pass a signal from a signal input to a signal output. The tunable ferroelectric acoustic resonator structure is configured to block the signal in a parallel resonance frequency by presenting an equivalent parallel capacitance between the signal input and the signal output. The series resonance frequency can be tuned by applying a voltage to polarize the tunable ferroelectric acoustic resonator structure. However, the voltage can also cause an increase in the equivalent parallel capacitance to therefore shift the parallel resonance frequency toward the series resonance frequency. To help maintain the parallel resonance frequency while tuning the series resonance frequency, the tunable ferroelectric acoustic resonator structure can be configured according to various embodiments of the present disclosure to reduce the equivalent parallel capacitance that is increased when tuning the series resonance frequency. As a result, it is possible to change the series resonance frequency and maintain the parallel resonance frequency of the tunable ferroelectric acoustic resonator structure.

In one aspect, a tunable ferroelectric acoustic resonator structure is provided. The tunable ferroelectric acoustic resonator structure includes a first resonator network. The first resonator network is coupled between a signal input and an intermediate node and configured to resonate in a series resonance frequency to pass a signal from the signal input to the intermediate node. The tunable ferroelectric acoustic resonator structure also includes a second resonator network. The second resonator network is coupled between the intermediate node and a signal output and configured to resonate in the series resonance frequency to pass the signal from the intermediate node to the signal output. The tunable ferroelectric acoustic resonator structure also includes at least one first switch. The at least one first switch is coupled between the signal input and the first resonator network. The tunable ferroelectric acoustic resonator structure also includes at least one second switch. The at least one second switch is coupled between the signal output and the second resonator network. The tunable ferroelectric acoustic resonator structure also includes a control circuit. The control circuit is configured to open one or more of the at least one first switch and the at least one second switch when a voltage is applied to the intermediate node to thereby tune the series resonance frequency of the first resonator network and the second resonator network. The control circuit is also configured to close the one or more of the at least one first switch and the at least one second switch when the voltage is removed from the intermediate node.

In another aspect, a wireless device is provided. The wireless device includes a tunable ferroelectric acoustic resonator structure. The tunable ferroelectric acoustic resonator structure includes a first resonator network. The first resonator network is coupled between a signal input and an intermediate node and configured to resonate in a series resonance frequency to pass a signal from the signal input to the intermediate node. The tunable ferroelectric acoustic resonator structure also includes a second resonator network. The second resonator network is coupled between the intermediate node and a signal output and configured to resonate in the series resonance frequency to pass the signal from the intermediate node to the signal output. The tunable ferroelectric acoustic resonator structure also includes at least one first switch. The at least one first switch is coupled between the signal input and the first resonator network. The tunable ferroelectric acoustic resonator structure also includes at least one second switch. The at least one second switch is coupled between the signal output and the second resonator network. The tunable ferroelectric acoustic resonator structure also includes a control circuit. The control circuit is configured to open one or more of the at least one first switch and the at least one second switch when a voltage is applied to the intermediate node to thereby tune the series resonance frequency of the first resonator network and the second resonator network. The control circuit is also configured to close the one or more of the at least one first switch and the at least one second switch when the voltage is removed from the intermediate node.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

Figure 1B:
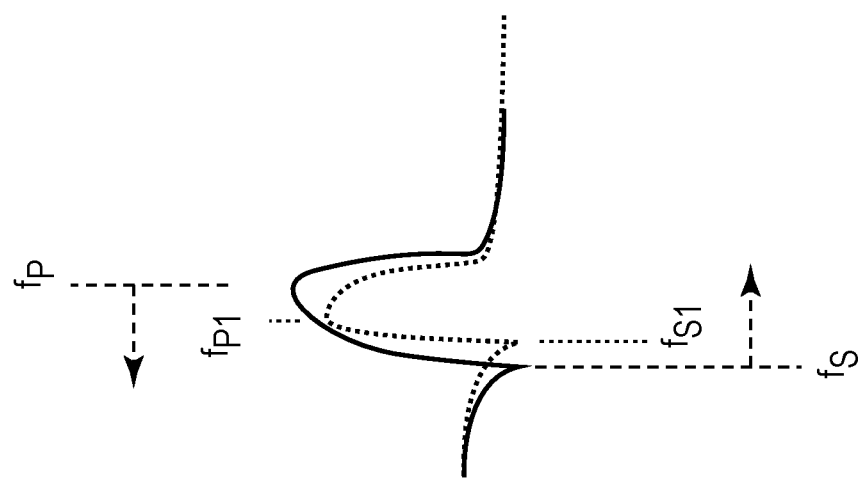
FIG. 1B is a graphic diagram providing an exemplary illustration as to how a parallel resonance frequency of the existing tunable ferroelectric acoustic resonator in FIG. 1A may shift when a series resonance frequency of the existing tunable ferroelectric acoustic resonator is tuned.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a tunable ferroelectric acoustic resonator structure. The tunable ferroelectric acoustic resonator structure is configured to resonate in a series resonance frequency to pass a signal from a signal input to a signal output. The tunable ferroelectric acoustic resonator structure is configured to block the signal in a parallel resonance frequency by presenting an equivalent parallel capacitance between the signal input and the signal output. The series resonance frequency can be tuned by applying a voltage to polarize the tunable ferroelectric acoustic resonator structure. However, the voltage can also cause an increase in the equivalent parallel capacitance to therefore shift the parallel resonance frequency toward the series resonance frequency. To help maintain the parallel resonance frequency while tuning the series resonance frequency, the tunable ferroelectric acoustic resonator structure can be configured according to various embodiments of the present disclosure to reduce the equivalent parallel capacitance that is increased when tuning the series resonance frequency. As a result, it is possible to change the series resonance and maintain the parallel resonance frequency of the tunable ferroelectric acoustic resonator structure.

Figure 1A:
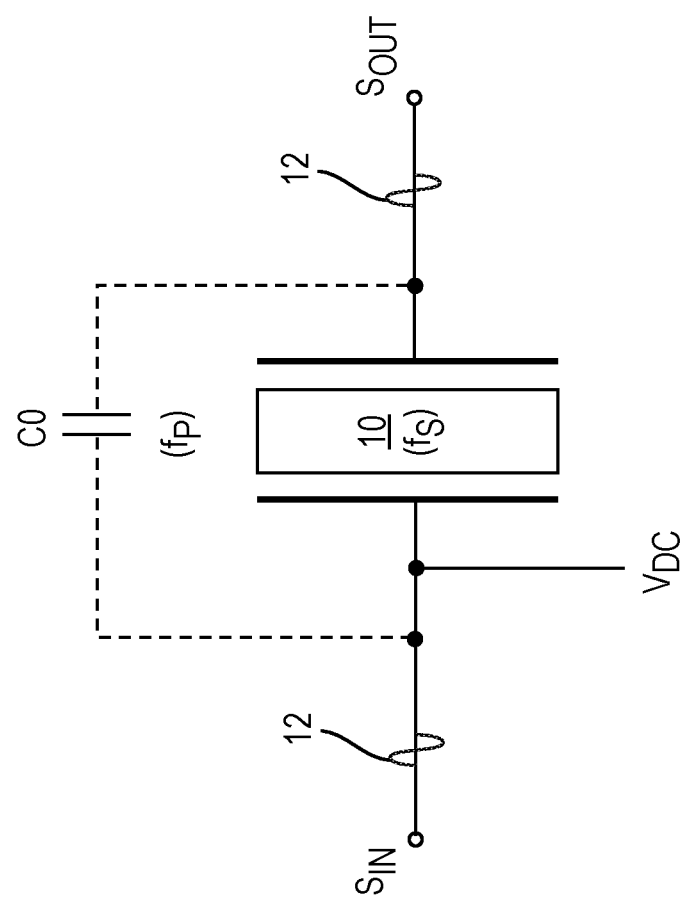
FIG. 1A is a schematic diagram of an exemplary existing tunable ferroelectric acoustic resonator.
Figure 2:
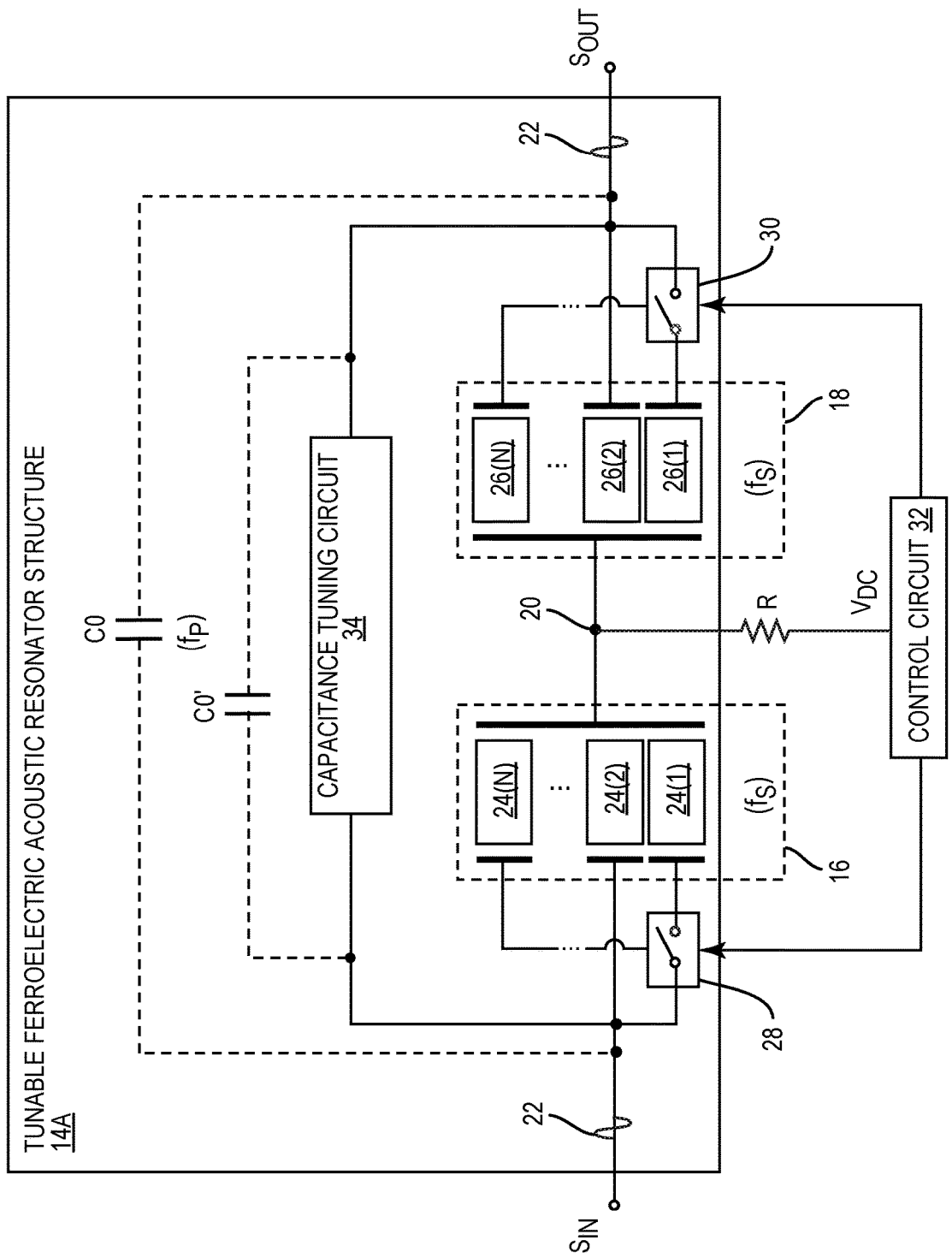
FIG. 2 is a schematic diagram of an exemplary tunable ferroelectric acoustic resonator structure configured according to an embodiment of the present disclosure to maintain a parallel resonance frequency while a series resonance frequency is tuned.

Before discussing a tunable ferroelectric acoustic resonator structure of the present disclosure, starting at FIG. 2, a brief discussion is first provided with reference to FIGS. 1A and 1B to help explain the technical problem to be solved by the tunable ferroelectric acoustic resonator structure of the present disclosure.

FIG. 1A is a schematic diagram of an exemplary existing tunable ferroelectric acoustic resonator 10. The existing tunable ferroelectric acoustic resonator 10 is designed to resonate in a series resonance frequency $f_S$ to pass a signal 12 from a signal input $S_{IN}$ to a signal output $S_{OUT}$. The existing tunable ferroelectric acoustic resonator 10 is also designed to present an equivalent parallel capacitance C0 between the signal input $S_{IN}$ and the signal output $S_{OUT}$ to thereby block the signal 12 in a parallel resonance frequency $f_P$ ($f_P \neq f_S$).

The series resonance frequency $f_S$ can be tuned by a voltage $V_{DC}$ that polarizes the existing tunable ferroelectric acoustic resonator 10. In this regard, FIG. 1B is a graphic diagram providing an exemplary illustration as to how the parallel resonance frequency $f_P$ may shift when the series resonance frequency $f_S$ is tuned by the voltage $V_{DC}$.

As shown in FIG. 1B, the voltage $V_{DC}$ can cause the series resonance frequency $f_S$ to shift rightward to an intended new series resonance frequency $f_{S1}$. However, the voltage $V_{DC}$ also causes the parallel resonance frequency $f_P$ to shift leftward to an unintended new parallel resonance frequency $f_{P1}$. Such leftward shifting of the parallel resonance frequency $f_P$ can create problems (e.g., insufficient separation between a passband and a stopband) in some applications. Studies have shown that the leftward shift of the parallel resonance frequency $f_P$ results from an increase in the equivalent parallel capacitance C0. As such, it is desirable to reduce a variation of the equivalent parallel capacitance C0 while tuning the series resonance frequency $f_S$ to thereby minimize a variation in the parallel resonance frequency $f_P$.

In this regard, FIG. 2 is a schematic diagram of an exemplary tunable ferroelectric acoustic resonator structure 14A configured according to an embodiment of the present disclosure to maintain a parallel resonance frequency $f_P$ while a series resonance frequency $f_S$ of the tunable ferroelectric acoustic resonator structure 14A is tuned. As described in detail below, the tunable ferroelectric acoustic resonator structure 14A is configured according to an embodiment of the present disclosure to offset at least a portion of the equivalent parallel capacitance C0 (as shown in FIG. 1A) that is increased when the tunable ferroelectric acoustic resonator structure 14A is tuned by a voltage $V_{DC}$ to change a series resonance frequency $f_S$. Understandably, by reducing the variation in the equivalent parallel capacitance C0, it is possible to prevent the parallel resonance frequency $f_P$ from shifting leftward (as shown in FIG. 1B), thus helping to improve filter performance of the tunable ferroelectric acoustic resonator structure 14A.

In an embodiment, the tunable ferroelectric acoustic resonator structure 14A includes a first resonator network 16 and a second resonator network 18. The first resonator network 16 is coupled between a signal input $S_{IN}$ and an intermediate node 20, and the second resonator network 18 is coupled between the intermediate node 20 and a signal output $S_{OUT}$. Specifically, the first resonator network 16 is configured to resonate at the series resonance frequency $f_S$ to pass a signal 22 from the signal input $S_{IN}$ to the intermediate node 20, and the second resonator network 18 is configured to resonate at the series resonance frequency $f_S$ to pass the signal 22 from the intermediate node 20 to the signal output $S_{OUT}$. In the parallel resonance frequency $f_P$, the first resonator network 16 and the second resonator network 18 will collectively cause an equivalent parallel capacitance C0 to block the signal 22 between the signal input $S_{IN}$ and the signal output $S_{OUT}$.

In an embodiment, the first resonator network 16 includes multiple first ferroelectric acoustic resonators 24(1)-24(N), which are coupled in parallel between the signal input $S_{IN}$ and the intermediate node 20. Similarly, the second resonator network 18 includes multiple second ferroelectric acoustic resonators 26(1)-26(N) that are coupled in parallel between the intermediate node 20 and the signal output $S_{OUT}$.

The tunable ferroelectric acoustic resonator structure 14A also includes at least one first switch 28 and at least one second switch 30. In a non-limiting example, the first switch 28 and the second switch 30 can be silicon-on-insulator (SOI) switches.

Specifically, the first switch 28 is coupled between the signal input $S_{IN}$ and one or more of the first ferroelectric acoustic resonators 24(1)-24(N) in the first resonator network 16. In a non-limiting example, the first switch 28 is shown herein to be coupled to the first ferroelectric acoustic resonators 24(1) and 24(N), but not to the first ferroelectric acoustic resonator 24(2).

The second switch 30 is coupled between the signal output $S_{OUT}$ and one or more of the second ferroelectric acoustic resonators 26(1)-26(N) in the second resonator network 18. In a non-limiting example, the second switch 30 is shown herein to be coupled to the second ferroelectric acoustic resonators 26(1) and 26(N), but not to the second ferroelectric acoustic resonator 26(2).

The tunable ferroelectric acoustic resonator structure 14A can include, or be coupled to, a control circuit 32, which can be a field-programmable gate array (FPGA) or an application-specific integrated circuit (ASIC), as an example. The control circuit 32 is coupled to the intermediate node 20 via a resistor (denoted as "R"). Accordingly, the control circuit 32 can provide a voltage $V_{DC}$ (e.g., a pulse voltage) to the intermediate node 20 to polarize the first resonator network 16 and the second resonator network 18 to thereby change the series resonance frequency $f_S$ of the tunable ferroelectric acoustic resonator structure 14A. Notably, by providing the voltage $V_{DC}$ to the intermediate node 20 located in between the first resonator network 16 and the second resonator network 18, it is possible to isolate the voltage $V_{DC}$ from the signal input $S_{IN}$ and the signal output $S_{OUT}$.

The control circuit 32 is also coupled to the first switch 28 and the second switch 30. Accordingly, the control circuit 32 is able to open and/or close any of the first switch 28 and the second switch 30.

According to an embodiment of the present disclosure, the control circuit 32 is configured to open the first switch 28 and/or the second switch 30 concurrent to applying the voltage $V_{DC}$ to the intermediate node 20 to change the series resonance frequency $f_S$ of the tunable ferroelectric acoustic resonator structure 14A. Understandably, by opening the first switch 28, some of the first ferroelectric acoustic resonators 24(1)-24(N) are decoupled from the signal input $S_{IN}$ and the intermediate node 20. As a result, the first resonator network 16 will contribute less to the variation in the equivalent capacitance C0. Similarly, by opening the second switch 30, some of the second ferroelectric acoustic resonators 26(1)-26(N) are decoupled from the signal output $S_{OUT}$ and the intermediate node 20. As a result, the second resonator network 18 will also contribute less to the variation in the equivalent capacitance C0. As a result, the first resonator network 16 and the second resonator network 18 can collectively reduce a portion of the increased equivalent parallel capacitance C0 by reducing a respective contribution to the increased equivalent parallel capacitance C0.

In some cases, it may not be able to completely offset the increased equivalent parallel capacitance C0 in its entirety solely by reducing the respective contribution to the increased equivalent parallel capacitance C0 by the first resonator network 16 and the second resonator network 18. To help cancel any residual portion of the increased equivalent parallel capacitance C0, the tunable ferroelectric acoustic resonator structure 14A can further include a capacitance tuning circuit 34. Herein, the capacitance tuning circuit 34 is coupled between the signal input $S_{IN}$ and the signal output $S_{OUT}$, in parallel to the first resonator network 16 and the second resonator network 18. The capacitance tuning circuit 34 may be configured to generate a tunable capacitance C0' to help offset any residual portion of the increased equivalent parallel capacitance C0.

In one embodiment, the capacitance tuning circuit 34 may generate the tunable capacitance C0' as a negative tunable capacitance (e.g., between −2 pF and −0.4 pF). In another embodiment, the capacitance tuning circuit 34 may generate the tunable capacitance C0' as a positive tunable capacitance (e.g., between 0.4 pF and 2 pF). The capacitance tuning circuit 34 may be implemented according to a variety of embodiments as described in U.S. patent application Ser. No. 16/385,301, entitled "ACOUSTIC STRUCTURE HAVING TUNABLE PARALLEL RESONANCE FREQUENCY."

In this regard, the first resonator network 16 and the second resonator network 18 may collectively reduce a portion of the increased equivalent parallel capacitance C0 by each contributing less to the increased equivalent parallel capacitance C0, while the capacitance tuning circuit 34 may generate the tunable capacitance C0' to further offset the residual portion of the increased equivalent parallel capacitance C0. As a combined result, it is possible to completely offset the increased equivalent parallel capacitance C0 to thereby prevent or mitigate the leftward shift of the parallel resonance frequency $f_P$ (as shown in FIG. 1B) when the series resonance frequency $f_S$ is tuned.

Upon completion of tuning the series resonance frequency $f_S$, the control circuit 32 will remove the voltage $V_{DC}$ from the intermediate node 20. Concurrently or subsequently, the control circuit 32 will close the first switch 28 and/or the second switch 30 that were previously opened.

Figure 3:
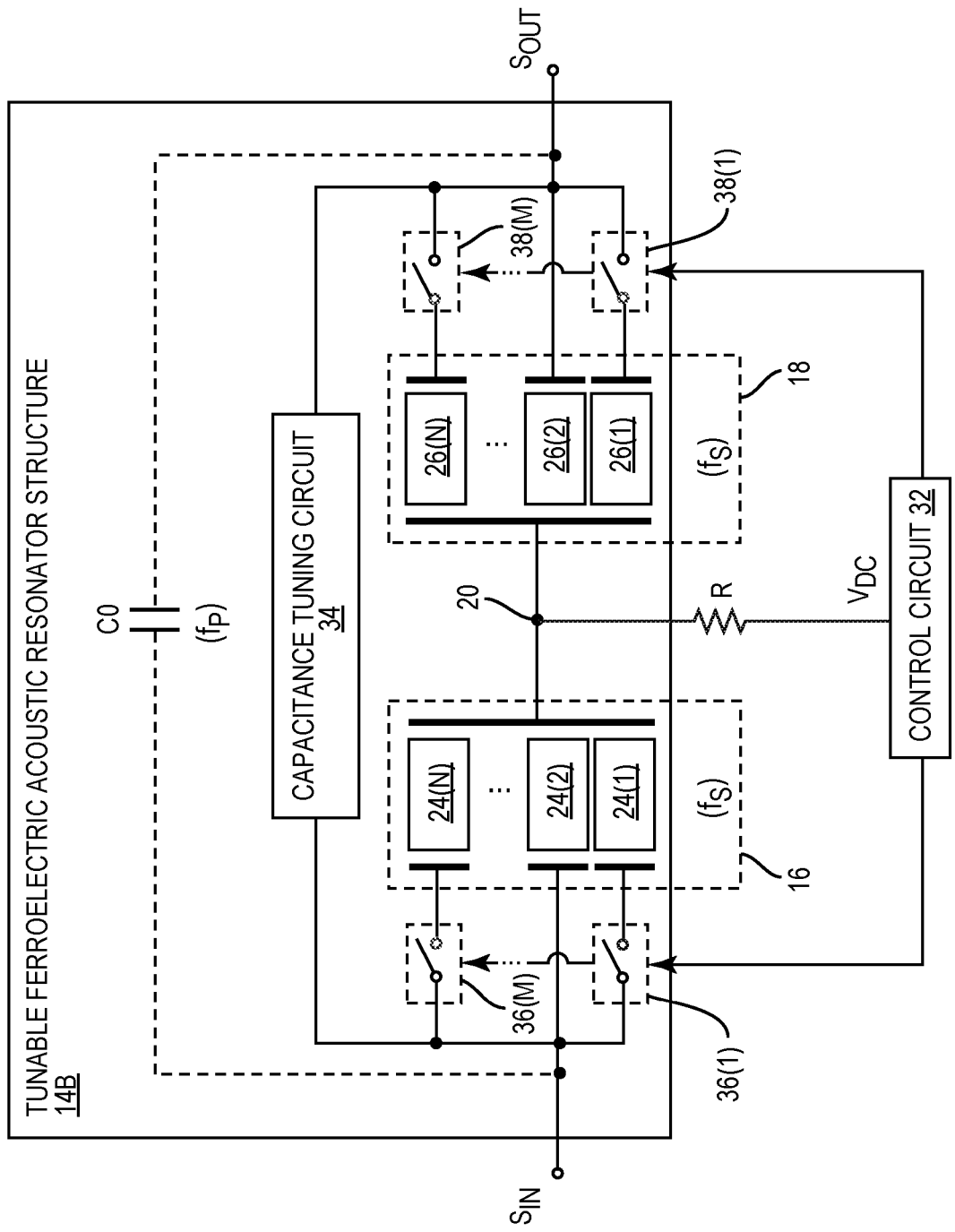
FIG. 3 is a schematic diagram of an exemplary tunable ferroelectric acoustic resonator structure configured according to another embodiment of the present disclosure.

FIG. 3 is a schematic diagram of an exemplary tunable ferroelectric acoustic resonator structure 14B configured according to another embodiment of the present disclosure. Common elements between FIGS. 2 and 3 are shown therein with common element numbers and will not be re-described herein.

The tunable ferroelectric acoustic resonator structure 14B differs from the tunable ferroelectric acoustic resonator structure 14A in that the first switch 28 is replaced by one or more first switches 36(1)-36(M) (M≤N) and the second switch 30 is replaced by one or more second switches 38(1)-38(M). Each of the first switches 36(1)-36(M) is coupled to a respective one of one or more of the first ferroelectric acoustic resonators 24(1)-24(N) when M is equal to N. For example, the first switch 36(1) is coupled to the first ferroelectric acoustic resonator 24(1) and the first switch 36(M) is coupled to the first ferroelectric acoustic resonator 24(N). Similarly, each of the second switches 38(1)-38(M) is coupled to a respective one of one or more of the second ferroelectric acoustic resonators 26(1)-26(N) when M is equal to N. For example, the second switch 38(1) is coupled to the second ferroelectric acoustic resonator 26(1) and the second switch 38(M) is coupled to the second ferroelectric acoustic resonator 26(N). As such, the control circuit 32 can individually control (open or close) each of the first switches 36(1)-36(M) and the second switches 38(1)-38(M) based on a desirable combination.

Figure 4:
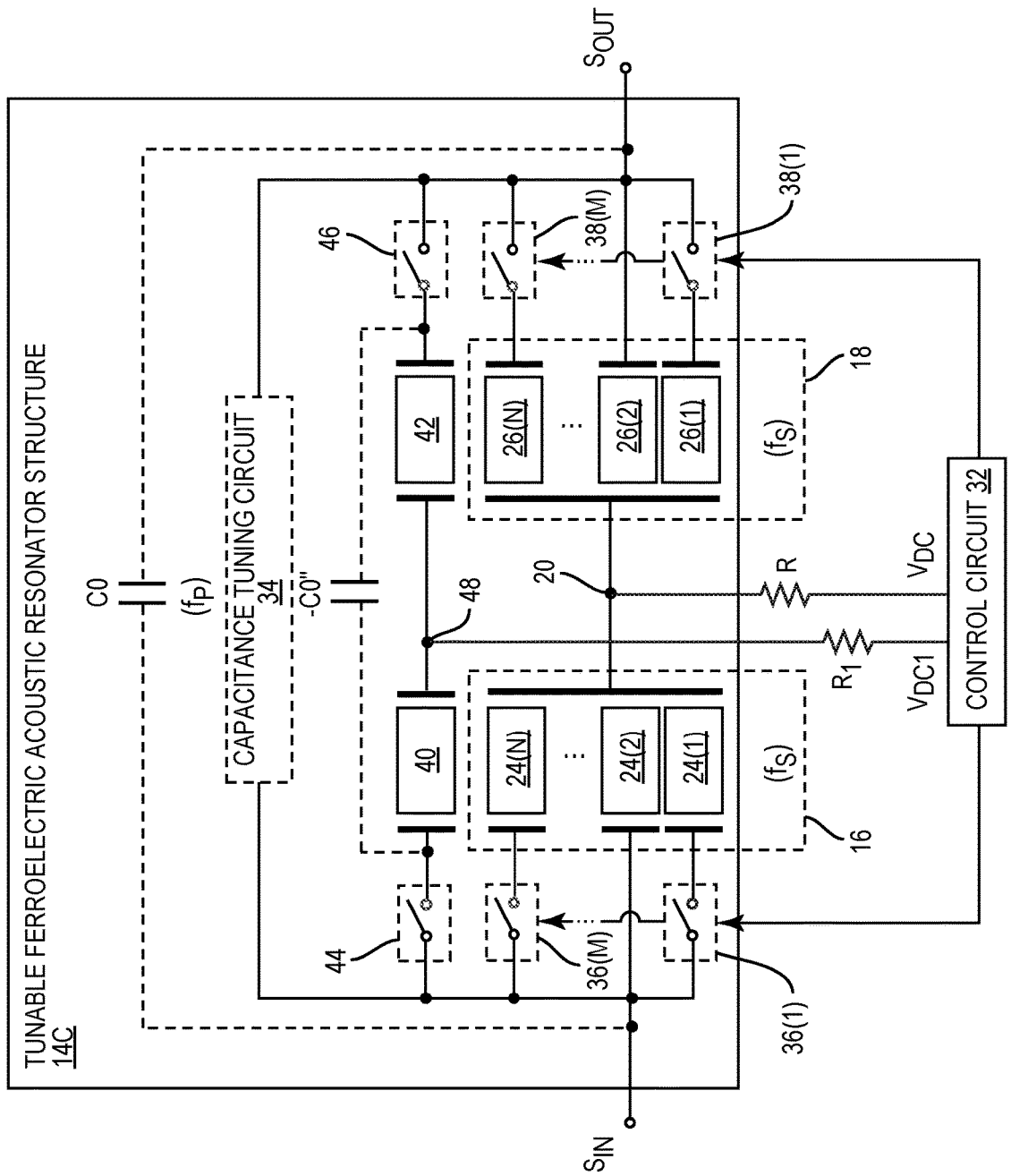
FIG. 4 is a schematic diagram of an exemplary tunable ferroelectric acoustic resonator structure configured according to yet another embodiment of the present disclosure.

FIG. 4 is a schematic diagram of an exemplary tunable ferroelectric acoustic resonator structure 14C configured according to another embodiment of the present disclosure. Common elements between FIGS. 2, 3, and 4 are shown therein with common element numbers and will not be re-described herein.

Herein, the tunable ferroelectric acoustic resonator structure 14C includes a third ferroelectric acoustic resonator 40, a fourth ferroelectric acoustic resonator 42, a third switch 44, and a fourth switch 46. The third switch 44 is coupled to the signal input $S_{IN}$, the third ferroelectric acoustic resonator 40 is coupled to the third switch 44, the fourth ferroelectric acoustic resonator 42 is coupled to the third ferroelectric acoustic resonator 40, and the fourth switch 46 is coupled between the fourth ferroelectric acoustic resonator 42 and the signal output $S_{OUT}$.

The control circuit 32 may provide a second voltage $V_{DC1}$ (e.g., a pulse voltage) to a coupling node 48, which is located between the third ferroelectric acoustic resonator 40 and the fourth ferroelectric acoustic resonator 42, via a second resistor $R_1$ to thereby cause a negative equivalent parallel capacitance −C0" between the signal input $S_{IN}$ and the signal output $S_{OUT}$. In an embodiment, the negative equivalent parallel capacitance −C0" may be able to offset the residual portion of the increased equivalent parallel capacitance C0, thus making the capacitance tuning circuit 34 optional in the tunable ferroelectric acoustic resonator structure 14C.

In an alternative embodiment, the third ferroelectric acoustic resonator 40 and the fourth ferroelectric acoustic resonator 42 may coexist with the capacitance tuning circuit 34. In this regard, the first resonator network 16 and the second resonator network 18 may collectively reduce a first portion of the increased equivalent parallel capacitance C0 by each contributing less to the increased equivalent parallel capacitance C0, the third ferroelectric acoustic resonator 40 and the fourth ferroelectric acoustic resonator 42 can collectively present the negative equivalent parallel capacitance −C0" to further offset a second portion of the increased equivalent parallel capacitance C0, and the capacitance tuning circuit 34 may generate the tunable capacitance C0' to further offset any residual portion of the increased equivalent parallel capacitance C0.

Figure 5:
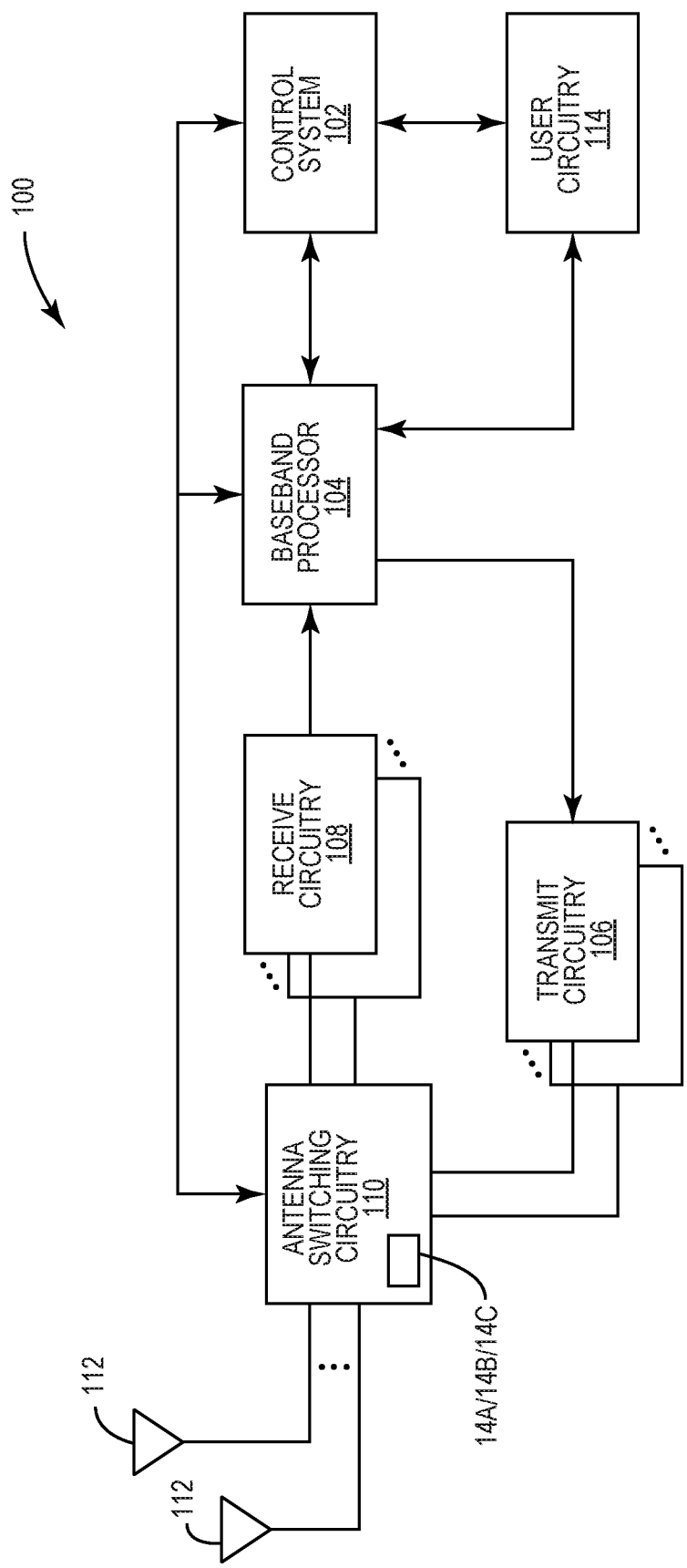
FIG. 5 is a schematic diagram of an exemplary user element wherein the tunable ferroelectric acoustic resonator structures of FIGS. 2, 3, and 4 can be provided.

The tunable ferroelectric acoustic resonator structure 14A of FIG. 2, the tunable ferroelectric acoustic resonator structure 14B of FIG. 3, and the tunable ferroelectric acoustic resonator structure 14C of FIG. 4 can be provided in a user element to support the embodiments described above. In this regard, FIG. 5 is a schematic diagram of an exemplary user element 100 wherein the tunable ferroelectric acoustic resonator structure 14A of FIG. 2, the tunable ferroelectric acoustic resonator structure 14B of FIG. 3, and the tunable ferroelectric acoustic resonator structure 14C of FIG. 4 can be provided.

Herein, the user element 100 can be any type of user elements, such as mobile terminals, smart watches, tablets, computers, navigation devices, access points, and like wireless communication devices that support wireless communications, such as cellular, wireless local area network (WLAN), Bluetooth, and near field communications. The user element 100 will generally include a control system 102, a baseband processor 104, transmit circuitry 106, receive circuitry 108, antenna switching circuitry 110, multiple antennas 112, and user interface circuitry 114. In a non-limiting example, the control system 102 can be a field-programmable gate array (FPGA), as an example. In this regard, the control system 102 can include at least a microprocessor(s), an embedded memory circuit(s), and a communication bus interface(s). The receive circuitry 108 receives radio frequency signals via the antennas 112 and through the antenna switching circuitry 110 from one or more base stations. A low noise amplifier and a filter cooperate to amplify and remove broadband interference from the received signal for processing. Downconversion and digitization circuitry (not shown) will then downconvert the filtered, received signal to an intermediate or baseband frequency signal, which is then digitized into one or more digital streams using analog-to-digital converter(s) (ADC).

The baseband processor 104 processes the digitized received signal to extract the information or data bits conveyed in the received signal. This processing typically comprises demodulation, decoding, and error correction operations, as will be discussed in greater detail below. The baseband processor 104 is generally implemented in one or more digital signal processors (DSPs) and application specific integrated circuits (ASICs).

For transmission, the baseband processor 104 receives digitized data, which may represent voice, data, or control information, from the control system 102, which it encodes for transmission. The encoded data is output to the transmit circuitry 106, where a digital-to-analog converter(s) (DAC) converts the digitally encoded data into an analog signal and a modulator modulates the analog signal onto a carrier signal that is at a desired transmit frequency or frequencies. A power amplifier will amplify the modulated carrier signal to a level appropriate for transmission, and deliver the modulated carrier signal to the antennas 112 through the antenna switching circuitry 110. The multiple antennas 112 and the replicated transmit and receive circuitries 106, 108 may provide spatial diversity. Modulation and processing details will be understood by those skilled in the art. In an embodiment, the tunable ferroelectric acoustic resonator structure 14A of FIG. 2, the tunable ferroelectric acoustic resonator structure 14B of FIG. 3, and the tunable ferroelectric acoustic resonator structure 14C of FIG. 4 can be provided in the antenna switching circuitry 110.

Those skilled in the art will recognize improvements and modifications to the embodiments of the present disclosure. All such improvements and modifications are considered within the scope of the concepts disclosed herein and the claims that follow.

What is claimed is:

1. A tunable ferroelectric acoustic resonator structure comprising:
   a first resonator network coupled between a signal input and an intermediate node and configured to resonate in a series resonance frequency to pass a signal from the signal input to the intermediate node;
   a second resonator network coupled between the intermediate node and a signal output and configured to resonate in the series resonance frequency to pass the signal from the intermediate node to the signal output;
   at least one first switch coupled between the signal input and the first resonator network;
   at least one second switch coupled between the signal output and the second resonator network; and
   a control circuit configured to:
      open one or more of the at least one first switch and the at least one second switch when a voltage is applied to the intermediate node to thereby tune the series resonance frequency of the first resonator network and the second resonator network; and
      close the one or more of the at least one first switch and the at least one second switch when the voltage is removed from the intermediate node.

2. The tunable ferroelectric acoustic resonator structure of claim 1, wherein:
   the first resonator network comprises a plurality of first ferroelectric acoustic resonators coupled in parallel between the signal input and the intermediate node;
   the second resonator network comprises a plurality of second ferroelectric acoustic resonators coupled in parallel between the intermediate node and the signal output;
   the at least one first switch is coupled between the signal input and one or more of the plurality of first ferroelectric acoustic resonators; and
   the at least one second switch is coupled between the signal output and one or more of the plurality of second ferroelectric acoustic resonators.

3. The tunable ferroelectric acoustic resonator structure of claim 2, wherein:
   the at least one first switch comprises a lesser number of first switches than a number of the plurality of first ferroelectric acoustic resonators and is coupled to a subset of the plurality of first ferroelectric acoustic resonators; and
   the at least one second switch comprises a lesser number of second switches than a number of the plurality of second ferroelectric acoustic resonators and is coupled to a subset of the plurality of second ferroelectric acoustic resonators.

4. The tunable ferroelectric acoustic resonator structure of claim 2, wherein:
   the at least one first switch comprises an equal number of first switches as the plurality of first ferroelectric acoustic resonators and each is coupled to a respective one of the plurality of first ferroelectric acoustic resonators; and
   the at least one first switch comprises an equal number of second switches as the plurality of second ferroelectric acoustic resonators and each is coupled to a respective one of the plurality of second ferroelectric acoustic resonators.

5. The tunable ferroelectric acoustic resonator structure of claim 2, wherein:
   the first resonator network and the second resonator network are further configured to block the signal between the signal input and the signal output in a parallel resonance frequency outside the series resonance frequency; and
   the voltage applied to the intermediate node can increase an equivalent parallel capacitance collectively presented by the first resonator network and the second resonator network between the signal input and the signal output to cause the parallel resonance frequency to shift toward the series resonance frequency.

6. The tunable ferroelectric acoustic resonator structure of claim 5, wherein the control circuit is further configured to open the one or more of the at least one first switch and the at least one second switch when the voltage is applied to the intermediate node to thereby reduce a portion of the increased equivalent capacitance.

7. The tunable ferroelectric acoustic resonator structure of claim 6, further comprising a capacitance tuning circuit coupled between the signal input and the signal output and configured to generate a tunable capacitance to offset a residual portion of the increased equivalent parallel capacitance.

8. The tunable ferroelectric acoustic resonator structure of claim 7, wherein the capacitance tuning circuit is further configured to generate the tunable capacitance as one of a negative tunable capacitance and a positive tunable capacitance between the signal input and the signal output.

9. The tunable ferroelectric acoustic resonator structure of claim 6, further comprising:
a third ferroelectric acoustic resonator and a fourth ferroelectric acoustic resonator coupled in series between the signal input and the signal output; and
the control circuit further configured to apply a second voltage to a coupling node located in between the third ferroelectric acoustic resonator and the fourth ferroelectric acoustic resonator to thereby cause a negative equivalent parallel capacitance between the signal input and the signal output to offset another portion of the increased equivalent parallel capacitance.

10. The tunable ferroelectric acoustic resonator structure of claim 9, further comprising a capacitance tuning circuit coupled between the signal input and the signal output and configured to generate a tunable negative capacitance to offset any residual portion of the increased equivalent parallel capacitance.

11. A wireless device comprising:
a tunable ferroelectric acoustic resonator structure comprising:
a first resonator network coupled between a signal input and an intermediate node and configured to resonate in a series resonance frequency to pass a signal from the signal input to the intermediate node;
a second resonator network coupled between the intermediate node and a signal output and configured to resonate in the series resonance frequency to pass the signal from the intermediate node to the signal output;
at least one first switch coupled between the signal input and the first resonator network;
at least one second switch coupled between the signal output and the second resonator network; and
a control circuit configured to:
open one or more of the at least one first switch and the at least one second switch when a voltage is applied to the intermediate node to thereby tune the series resonance frequency of the first resonator network and the second resonator network; and
close the one or more of the at least one first switch and the at least one second switch when the voltage is removed from the intermediate node.

12. The wireless device of claim 11, further comprising antenna switching circuitry coupled to receive circuitry, transmit circuitry, and a plurality of antennas and comprising the tunable ferroelectric acoustic resonator structure.

13. The wireless device of claim 11, wherein:
the first resonator network comprises a plurality of first ferroelectric acoustic resonators coupled in parallel between the signal input and the intermediate node;
the second resonator network comprises a plurality of second ferroelectric acoustic resonators coupled in parallel between the intermediate node and the signal output;
the at least one first switch is coupled between the signal input and one or more of the plurality of first ferroelectric acoustic resonators; and
the at least one second switch is coupled between the signal output and one or more of the plurality of second ferroelectric acoustic resonators.

14. The wireless device of claim 13, wherein:
the at least one first switch comprises a lesser number of first switches than a number of the plurality of first ferroelectric acoustic resonators and is coupled to a subset of the plurality of first ferroelectric acoustic resonators; and
the at least one second switch comprises a lesser number of second switches than a number of the plurality of second ferroelectric acoustic resonators and is coupled to a subset of the plurality of second ferroelectric acoustic resonators.

15. The wireless device of claim 13, wherein:
the at least one first switch comprises an equal number of first switches as the plurality of first ferroelectric acoustic resonators and each is coupled to a respective one of the plurality of first ferroelectric acoustic resonators; and
the at least one first switch comprises an equal number of second switches as the plurality of second ferroelectric acoustic resonators and each is coupled to a respective one of the plurality of second ferroelectric acoustic resonators.

16. The wireless device of claim 13, wherein:
the first resonator network and the second resonator network are further configured to block the signal between the signal input and the signal output in a parallel resonance frequency outside the series resonance frequency; and
the voltage applied to the intermediate node can increase an equivalent parallel capacitance collectively presented by the first resonator network and the second resonator network between the signal input and the signal output to cause the parallel resonance frequency to shift toward the series resonance frequency.

17. The wireless device of claim 16, wherein the control circuit is further configured to open the one or more of the at least one first switch and the at least one second switch when the voltage is applied to the intermediate node to thereby reduce a portion of the increased equivalent capacitance.

18. The wireless device of claim 17, further comprising a capacitance tuning circuit coupled between the signal input and the signal output and configured to generate a tunable capacitance to offset a residual portion of the increased equivalent parallel capacitance.

19. The wireless device of claim 17, further comprising:
a third ferroelectric acoustic resonator and a fourth ferroelectric acoustic resonator coupled in series between the signal input and the signal output; and
the control circuit further configured to apply a second voltage to a coupling node located in between the third ferroelectric acoustic resonator and the fourth ferroelectric acoustic resonator to thereby cause a negative equivalent parallel capacitance between the signal input and the signal output to offset another portion of the increased equivalent parallel capacitance.

20. The wireless device of claim 19, further comprising a capacitance tuning circuit coupled between the signal input and the signal output and configured to generate a tunable negative capacitance to offset any residual portion of the increased equivalent parallel capacitance.

* * * * *